United States Patent [19]

Peeno

[11] Patent Number: 5,337,677
[45] Date of Patent: Aug. 16, 1994

[54] VEHICLE SNACK TRAY

[76] Inventor: Sherman L. Peeno, 42 Creekwood Sq., Cincinnati, Ohio 45246

[21] Appl. No.: 38,022

[22] Filed: Mar. 29, 1993

[51] Int. Cl.⁵ .............................................. A47B 37/00
[52] U.S. Cl. .................................... 108/45; 248/223.4
[58] Field of Search ................................ 108/44, 45, 25; 248/224.4, 223.4, 27.1

[56] References Cited

U.S. PATENT DOCUMENTS

| | | | |
|---|---|---|---|
| 1,995,656 | 3/1935 | Stout | 108/45 |
| 2,825,611 | 3/1958 | Aynesworth | 108/45 |
| 3,785,300 | 1/1974 | Anderson | 108/44 |
| 3,804,031 | 4/1974 | Pitts | 108/44 |
| 3,880,091 | 4/1975 | Heinonen | 108/44 |
| 4,087,126 | 5/1978 | Wynn | 296/37.8 |
| 4,174,669 | 11/1979 | Lalonde | 108/44 |
| 4,359,004 | 11/1982 | Chappell | 108/44 |
| 4,511,072 | 4/1985 | Owens | 224/273 |
| 5,069,375 | 12/1991 | Flick | 224/273 |
| 5,106,003 | 4/1992 | Ma | 224/42.42 |

FOREIGN PATENT DOCUMENTS

| | | | |
|---|---|---|---|
| 1251131 | 12/1960 | France | 108/25 |
| 0074438 | 10/1947 | Norway | 108/45 |

*Primary Examiner*—Peter R. Brown
*Assistant Examiner*—Gerald A. Anderson
*Attorney, Agent, or Firm*—Ronald W. Kock

[57] ABSTRACT

Vehicle snack tray with at least one keyhole-shaped opening for supporting a beverage container with or without a handle. Below the opening is a platform for resting the beverage container when it is placed loosely within the opening. A plurality of beamsprings extend radially into the opening to stabilize the beverage container from horizontal motion. The snack tray has a mounting bracket for attachment to a vehicle dashboard. One bracket embodiment is fixedly attached to the tray. Another embodiment has dovetail-shaped surfaces which slidably engage the tray. Still another bracket embodiment is fixedly attached to the vehicle dashboard. Bracket alternatives are designed to fit predefined features of specific vehicles such as minivans. One alternative embodiment has three parallel male members which friction fit into a rectangular orifice in the minivan dashboard. Another embodiment has two pair of upward and downward facing hook-shaped members which engage top and bottom lips of an ashtray in the minivan dashboard.

6 Claims, 4 Drawing Sheets

VEHICLE SNACK TRAY

FIELD OF THE INVENTION

The present invention relates to snack trays adapted for use in vehicles, and more particularly to snack trays removably attachable to the dashboards of automobiles and minivans. Even more particularly the present invention relates to snack trays with attachment brackets designed to fit specific vehicle models, such as minivans.

BACKGROUND OF THE INVENTION

The fast-paced modern society of the United States consumes food in vehicles while commuting short distances and vacationing long distances. "Fast-food" carry-out service has further reinforced this trend. Snack trays for use in vehicles are therefore common in the art. However, few are seen in commercial use. Perhaps this is because many snack trays have not been designed for convenience of use or installation.

Few prior art vehicle snack trays provide for simple installation because they are typically designed for automobiles in general, and not for specific vehicle models. Since inner vehicle surfaces vary widely in shape, installation alternatives are limited. For example, many prior art trays require permanent installation, connection to passengers, hanging from an open window, or support by magnets to metallic surfaces inside a vehicle. Since modern passenger vehicles have predominantly non-metallic internal surfaces, magnetic attachment is not very useful.

Requiring a window to be open is also unrealistic because snack trays are often used while driving; and heat and air-conditioning function most effectively with windows closed. Trays connected to passengers for support limit the movement of passengers, and may even be dangerous in a vehicle collision. Permanently mounted snack trays are attached to windshields or dashboards by adhesives or threaded fasteners. These may be nuisances when not in use and they may devalue the vehicle at resale because of alteration to vehicle surfaces.

Some other tray designs rest on the driveshaft hump of rear-wheel-drive vehicles or fasten between front seatbacks. Such tray surfaces are inconvenient to reach and may be obstructive when it is necessary to evacuate a vehicle quickly.

Use of a snack tray is not always appropriate. Therefore, removal and storage of a snack tray is essential for convenience. Few prior art trays are easily stored because they are not designed to fit specific crevices of particular vehicles.

One of the most common vehicles for family travel is presently the minivan. The most popular of all minivans in the 1980's and early 1990's has been the Chrysler minivan. A deficiency of minivans and most other vehicles is sufficient and easily reachable dashboard space for supporting food and drink in a manner that minimizes spillage.

OBJECTS OF THE INVENTION

In light of the above, an object of the present invention is a snack tray that provides convenience of use by having an easily reached position with minimal interference to normal driving or passenger movement within the vehicle.

It is a further object of the present snack tray invention to be simply installed without the need for tools.

Another object of the present snack tray invention is convenient storage under the driver's seat when the tray is not needed.

It is still another object of the present invention to provide a tray which alleviates the snack food space deficiency of the most popular minivan model.

SUMMARY OF THE INVENTION

In practicing the present invention the lack of convenience with prior art vehicle snack trays is overcome because the present invention fits specific vehicles having predefined features. Such predefined features enable the tray to friction fit to the vehicle dashboard for simple installation and removal, storage of the tray under the driver's seat, and easily reachable surfaces of an installed tray.

In one preferred embodiment of the present invention a vehicle snack tray comprises a snack tray that has a bracket with at least one male member adapted to frictionally fit into an orifice of a vehicle dashboard. The bracket fixedly attached to the snack tray so that when the bracket is connected to the dashboard, the snack tray is cantilevered in a substantially horizontal plane.

In a second preferred embodiment of the present invention a vehicle snack tray comprises a tray that has a bracket with at least one pair of upward and downward facing hook-shaped members adapted to fit over the top and bottom lips of an ashtray of a vehicle dashboard. The bracket is fixedly attached to the snack tray so that when the bracket is connected to the dashboard, the snack tray is cantilevered in a substantially horizontal plane.

In a third preferred embodiment of the present invention a vehicle snack tray comprises a snack tray and a separate bracket which slidably engages mounting surfaces between the snack tray and the bracket. The mounting surfaces are substantially upright when the bracket is attached to a vehicle dashboard. The bracket also has means for removable attachment to the dashboard of a vehicle. When the bracket is attached to the dashboard, the snack tray is cantilevered in a substantially horizontal plane; and horizontal movement of the snack tray is resisted in all directions. The removable attachment means to a dashboard is the same as that of the first or second embodiment. The snack tray has a tray mounting surface that is substantially perpendicular to the tray surface, and the engaging surfaces are dovetail-shaped.

In a fourth embodiment of the present invention a vehicle snack tray comprises a snack tray which has a tray surface and a mounting surface substantially perpendicular to the tray surface. A bracket, fixedly attached to a dashboard of a vehicle has a tray attachment surface which slidably engages the mounting surface of the snack tray. The snack tray may be removed from the bracket when not in use, but when the snack tray is engaged with the bracket, the tray surface is cantilevered in a substantially horizontal plane; and horizontal movement of the snack tray is resisted in all directions.

The snack tray of the present invention comprises a tray surface with a perimeter rim extending above the tray surface to contain slidable items placed on the tray surface; at least one opening in the tray surface adapted to receive a beverage container; a platform, having a beverage container support position, adapted to fit beneath the opening; and a plurality of beamspring members adapted to fit into the opening. The beamspring members extend inward so that they will bend upon contact with a beverage container placed loosely in the opening, thereby stabilizing the beverage container from horizontal motion. The platform is pivotally mounted so it may be rotated approximately 90° from the beverage container support position for compact storage when the snack tray is not in use.

DETAILED DESCRIPTION OF THE INVENTION

Figure 1:
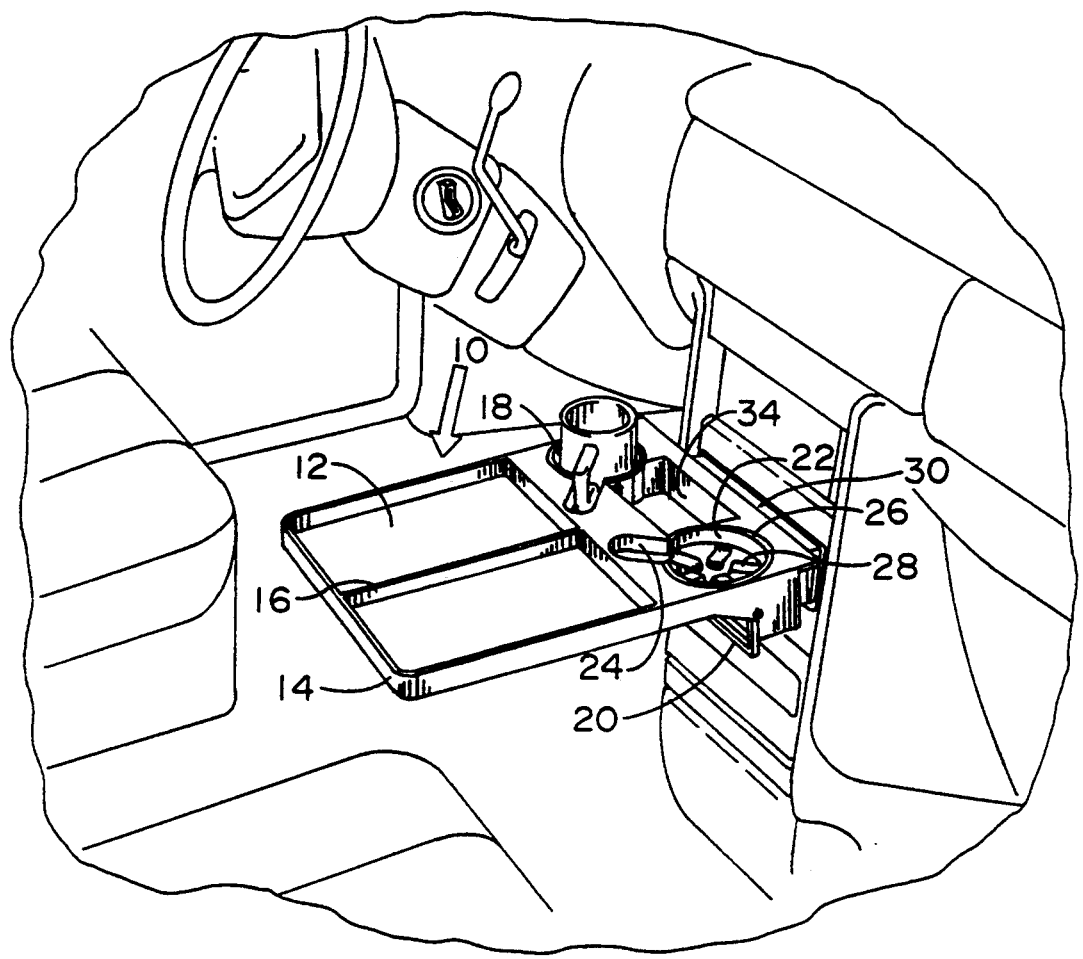
FIG. 1 a perspective view of a preferred embodiment of the present invention, disclosing a snack tray mounted to the dashboard of a vehicle, specifically a Chrysler minivan.

Referring now to the drawings, and more particularly to FIG. 1, there is shown a first preferred embodiment of the present invention, generally indicated as 10. Vehicle snack tray 10 is cantilevered from the dashboard of a vehicle between the driver and front seat passenger. The vehicle is preferably a Chrysler minivan having predefined features adaptable for mounting snack tray 10. Tray 10 is conveniently placed for easy reach, yet out of the way of vehicle operating levers, buttons, and dials. Snack tray 10 has tray surface 12 and a perimeter rim 14. Preferably surface 12 is divided into two portions by a divider rib 16. The rim and rib extend perpendicular from the tray surface to contain items placed thereon which could slide off surface 12 during acceleration, turning, and braking of the vehicle. The tray is meant to be used not only while the vehicle is at rest, but also while it is in motion.

Snack tray 10 also has at least one, and preferably two, keyhole-shaped openings 18 which are intended to support beverage containers having handles. Cylindrical or conical beverage containers rest on platforms 20 beneath the circular portions 22 of openings 18 while handles extend into the slotted portions 24 of openings 18. Beverage containers without handles fit into circular portions 22 only. Platforms 20 permit containers smaller in diameter than circular portions 22 to be loosely placed in the openings, thereby maximizing the range of container sizes which tray 10 will support. Openings 18 are also fitted with rings 26 adapted to snap-fit into circular portions 22. Rings 26 each have a plurality of beamsprings 28 extending radially into circular portions 22. When a beverage container is loosely placed into an opening 18, beamsprings 28 bend substantially an equal amount to center the beverage container in the opening and stabilize it from horizontal motion. Rings 26 each have gaps aligned with slotted portions 24 so that rings 26 do not interfere with container handles.

Figure 2:
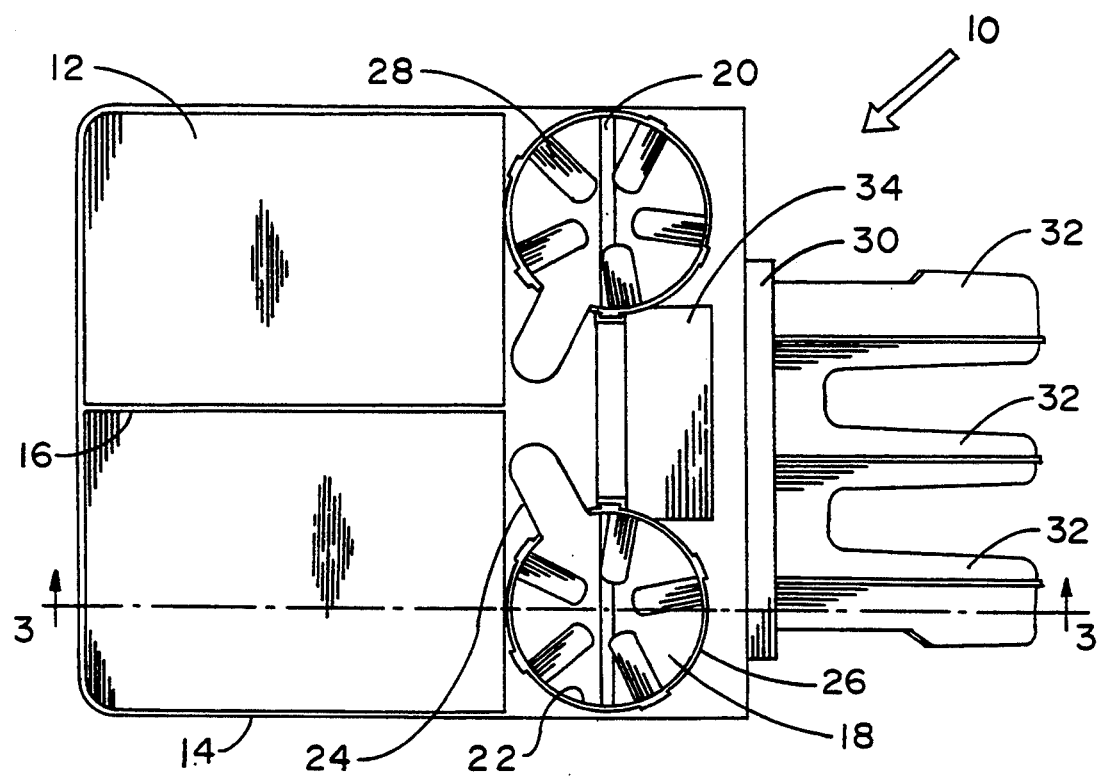
FIG. 2 is a top plan view of a preferred embodiment of the present invention, disclosing a mounting bracket designed for friction fit into an orifice of a vehicle dashboard.
Figure 3:
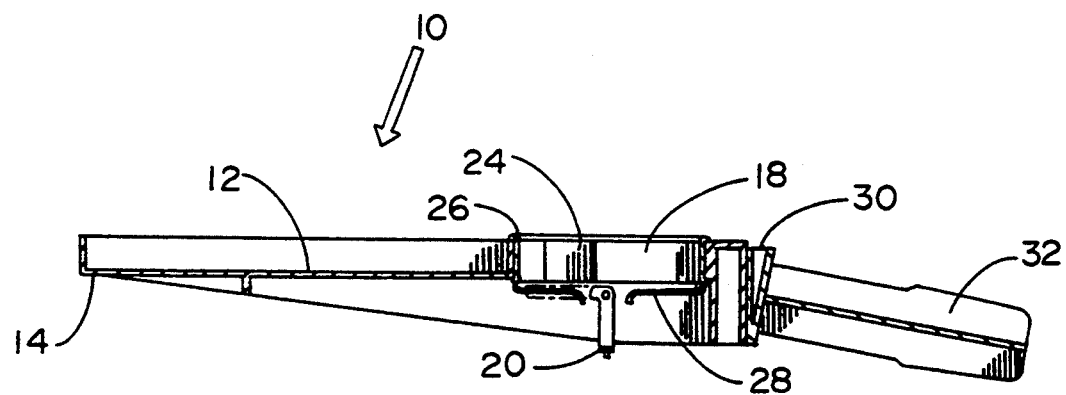
FIG. 3 is a sectioned side elevational view of the snack tray of FIG. 2, taken along section line 3—3 of FIG. 2, showing the mounting bracket attached to the tray.

Snack tray 10 is shown attached to the dashboard of a minivan in FIG. 1. Snack tray 10 has a mounting bracket 30 connected to the dashboard end of the tray. The mounting bracket is not visible in FIG. 1 since the tray is shown fully installed. However, FIGS. 2 and 3 show one preferred embodiment of a mounting bracket 30 attached to tray 10. Bracket 30 may either be fixedly attached or removably attached to tray 10. Bracket 30 has at least one male projection 32 extending from it which frictionally fits into an orifice of the minivan dashboard. Such an orifice is common to minivans. The rectangular orifice is normally intended for storage of small items, but such items may be relocated to a pocket 34 in tray 10 when bracket 30 is installed. Bracket 30 preferably has three male projections 32 which have ribs that are shaped to fit snugly into the dashboard orifice. Since the orifice has a slight taper, male projections 32 frictionally fit when fully inserted. Bracket 30 is preferably offset from the center of tray 10 so that when installed, tray 10 is horizontally positioned to be clear of operating levers of the vehicle and reachable by both driver and front seat passenger.

FIG. 3 shows bracket 30 at a slight angle to horizontal. This angle matches that of the orifice in the dashboard so that when bracket 30 is inserted, tray surface 12 is substantially level if the vehicle is on level ground. Also shown are two positions of platform 20 beneath opening 18. Platform 20 is preferably a bar which is pivoted at both ends such that it can be rotated approximately 90° from its beverage container support position to a storage position.

Figure 4:
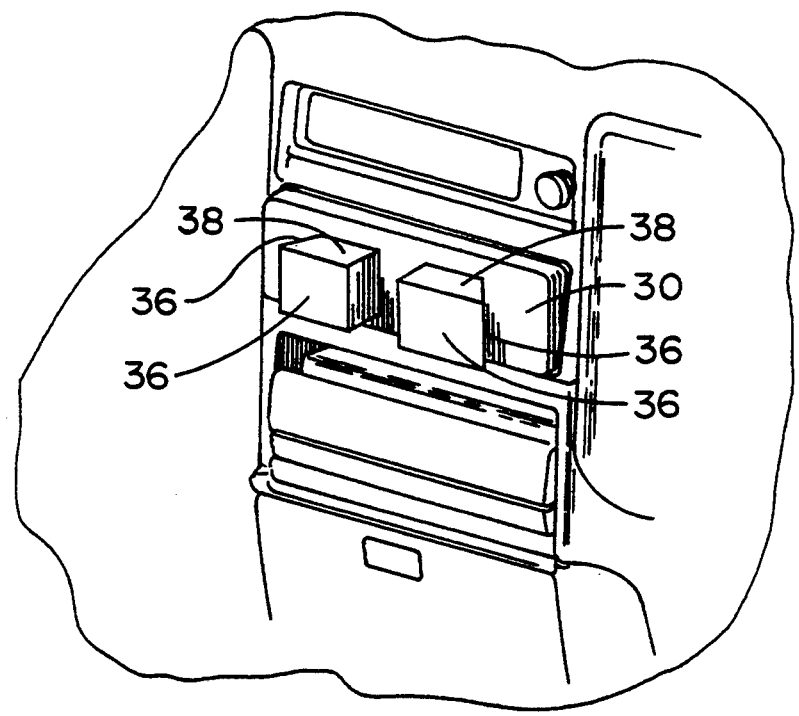
FIG. 4 is a perspective view of a snack tray mounting bracket attached to a dashboard of a vehicle, with the snack tray removed from the bracket.

FIG. 4 shows bracket 30 installed in the dashboard orifice of a minivan with the snack tray 10 removed. No tools are needed to install or remove bracket 30. It is possible, however, that bracket 30 may be fixedly attached to the dashboard orifice if snack tray 10 is removably attachable to the bracket. Bracket 30 preferably has dovetail-shaped surfaces 36 extending from it. Surfaces 36 are substantially upright. Dovetail shaped surfaces 36 have a horizontal top surface 38. The dovetail angle is preferably 45°. When surfaces 36 engage tray mounting surfaces, the tray is slidable vertically, yet horizontal motion is resisted in all directions.

Figure 5:
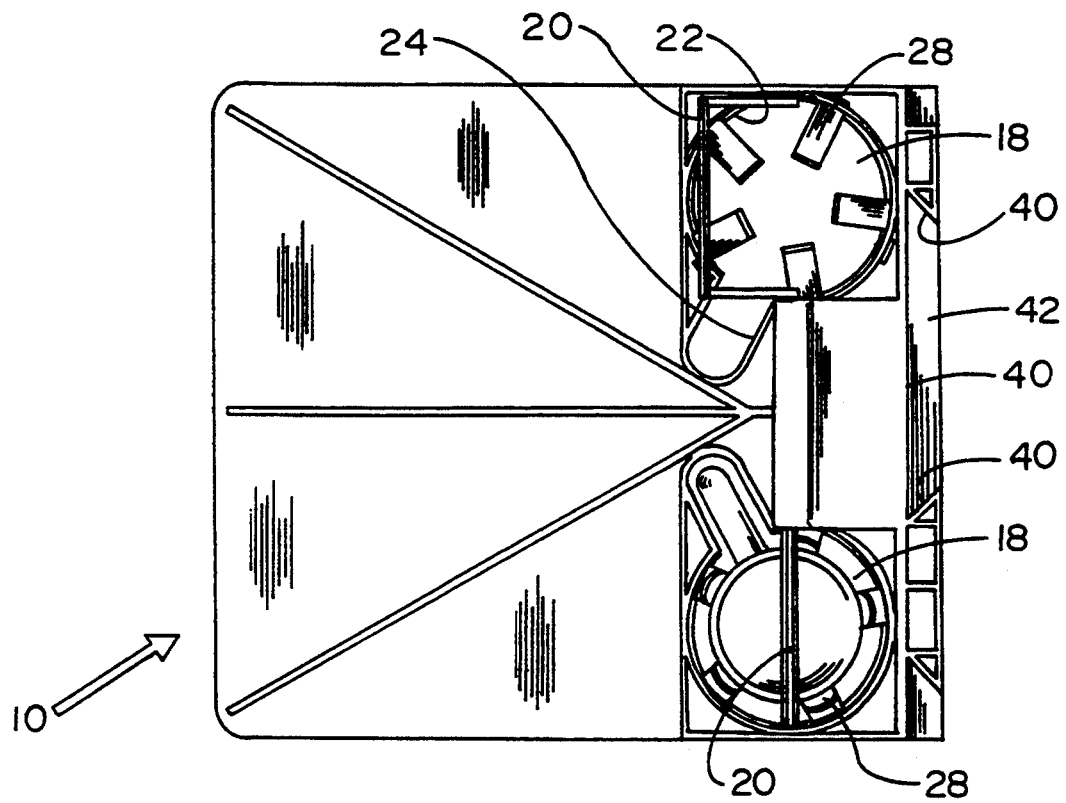
FIG. 5 is a bottom plan view of a preferred embodiment of the present invention, disclosing a snack tray removed from its mounting bracket, and showing features of the tray best seen from the bottom.

FIG. 5 shows the snack tray 10 from the bottom. Tray 10 has dovetail-shaped tray mounting surfaces 40 and stop surface 42. The tray 10 is assembled with bracket 30 by engaging tray mounting surfaces 40 with surfaces 36 of the bracket and sliding the tray 10 downward until stop surface 42 rests against top surface 38 of bracket 30. Preferably there is a male dovetail shape on the bracket and a female dovetail shape on the tray. Alternatively, there are other slidably engaging arrangements which could prevent horizontal motion, such as two upright bracket posts and matching tray holes.

FIG. 5 also shows the bottom of a cup in one opening 18 resting on platform 20 when platform 20 is in its beverage support position. The other opening 18 has no container in it and platform 20 is shown pivoted to its storage position. Preferably there are detents to hold platform 20 in each of its two extreme positions. Such detents can be overridden by manually rotating platform 20 from one position to the other.

Figure 6:
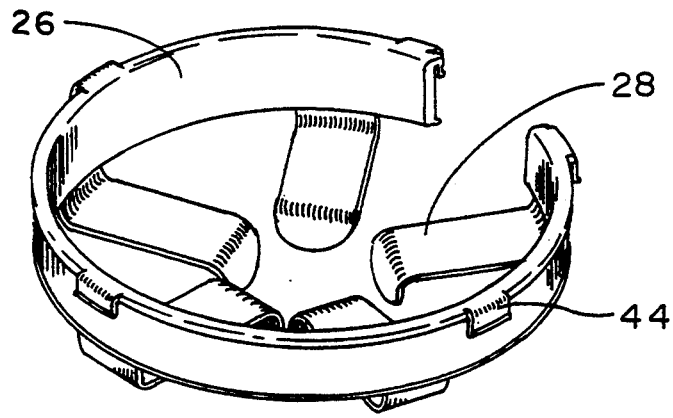
FIG. 6 is a perspective view of a ring adapted to fit into an opening of the snack tray of the preferred invention, disclosing a plurality of beamspring members.

FIG. 6 shows ring 26 with preferably five beamsprings 28 extending radially. Each beamspring is substantially the same length and thickness in order to provide approximately the same resistance when bent the same amount. The tips of beamsprings 28 are bent downward from their horizontal rest position so that when an average size beverage container is placed within ting 26, the curved portions of beamsprings 28 contact the container side wall. The tips of the beamsprings do not touch the sidewall in order to prevent wedging the container when the user attempts to remove it. Preferably ring 26 has tabs 44 which snap fit into mating slots around the perimeter of circular portion 22 of opening 18.

Figure 7:
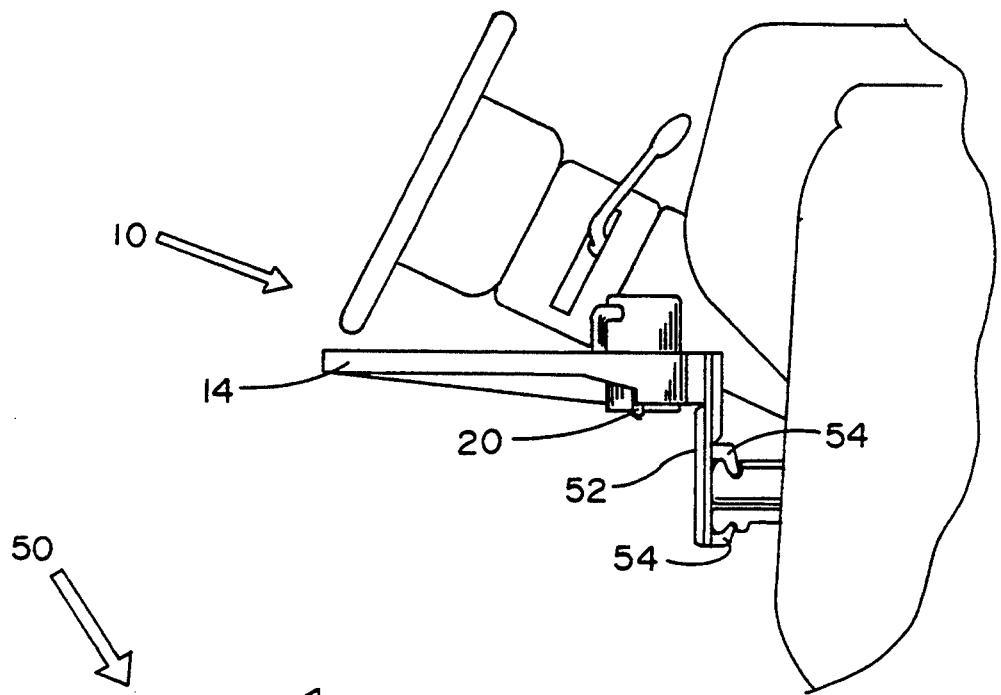
FIG. 7 is a side elevational view of another preferred embodiment of the present invention, disclosing a snack tray mounted to the ashtray of a minivan in the outer position of the ashtray.
Figure 8:
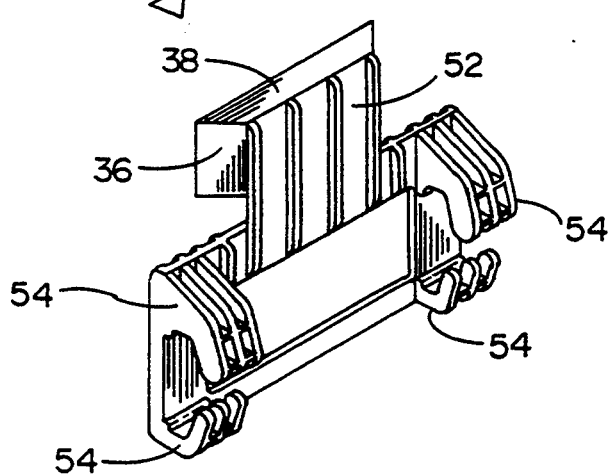
FIG. 8 is a perspective view of a tray mounting bracket of the embodiment of FIG. 7, showing upward and downward facing hook-shaped members for engaging the top and bottom lips of an ashtray.

FIG. 7 shows another embodiment of the present invention, generally indicated as 50. The same tray 10 is attached to an alternative mounting bracket 52. Bracket 52 has at least one and preferably two pairs of upward and downward facing hook-shaped members 54. Hook-shaped members 54 slide horizontally onto top and bottom lips of a dashboard ashtray of a minivan when the ashtray is pulled outward from the dashboard. Hook-shaped members 54 extend to both sides of the ashtray so that when the ashtray is returned to its retracted position in the dashboard, no lateral movement of bracket 52 is possible. FIG. 8 shows the hook-shaped members 54 of bracket 52 more clearly. Mounting bracket 52 preferably has dovetail-shaped surfaces 36 and top surface 38, opposite hook-shaped members, adapted to fit mating surfaces 40 and 42 of tray 10.

One preferred embodiment of the present invention is constructed as follows: snack tray 10 is injection molded of polyurethane, with overall dimensions of 12.56 inches (31.90 cm) length, 11.5 inches (29.21 cm) width, and 1.75 inches (4.45 cm) depth without a mounting bracket attached and with platforms 20 in their storage position. Keyhole-shaped openings 18 have circular portions 22, which are 3.50 inches (8.89 cm) in diameter, and slotted portions 24, which are 1 inch (2.54 cm) wide and 2.94 inches (7.47 cm) from the center of circular portions to the center of the semicircular ends of the slotted portions. The rib 16 and rim 14 each extend upward 0.47 inches (1.19 cm) from tray surface 12. Tray surface 12 and rim 14 and rib 16 are all 0.094 inches (0.24 cm) thick.

Rings 26 and beamsprings 28 are preferably injection molded of polyurethane. Five beamsprings are equally spaced; and each is 0.63 inches (1.60 cm) wide by 0.04 inches (0.10 cm) thick and 1.41 inches (3.58 cm) long, in order to have the desired resilience. Platforms 20 are injection molded polyurethane C-shaped bars with outward-facing trunions at the end of each bar. The trunions snap into holes in ribs beneath tray surface 12 such that the distance from the top of each opening 18 to the support surface of each platform 20 is 2.06 inches (5.24 cm). Trunions of each platform are located approximately midway between the top of each opening and the platform support surface.

The preferred tray has a removable tray mounting bracket 30, which is injection molded of polyurethane. It has dovetail-shaped surfaces 36 which slidably engage mating surfaces 40 of tray 10. A cross-section of the dovetail defined by these surfaces is a 45° angle trapezoid 0.63 inches (1.60 cm) high, with a short side dimension of 3.41 inches (8.66 cm), and a long side dimension of 4.66 inches (11.84 cm). Length of engagement when stop surface 42 of the tray contacts top surface 38 of the bracket is 1.66 inches (4.22 cm). One preferred mounting bracket has three male members 32 which extend 5.0 inches (12.7 cm) from the side of the bracket opposite the dovetail. The male members each have a cross-shaped cross-section with each rib being 0.094 inches (0.24 cm) thick, to provide rigidity and strength without having excess weight.

All injection molded parts, except for the mounting bracket, are molded of resins which can withstand temperatures approaching the boiling point of water without distortion or loss of strength occurring.

It is thought that the vehicle snack tray of the present invention, and many of its attendant advantages, will be understood from the foregoing description; and it will be apparent that various changes may be made in form, construction, and arrangement without departing from the spirit and scope of the invention or sacrificing all of its material advantages, the forms hereinbefore described being merely preferred or exemplary embodiments thereof.

What is claimed is:

1. A vehicle snack tray comprising:
   a) a tray surface, having a perimeter rim extending above said tray surface to contain slidable items placed on said tray surface;
   b) at least one opening in said tray surface adapted to receive a beverage container;
   c) a platform adapted to fit beneath said at least one tray opening, said platform having a beverage container support position;
   d) a plurality of beamspring members adapted to fit into said tray opening, said beamspring members extending inward so that they will bend upon contact with a beverage container placed loosely in said tray opening, thereby stabilizing the beverage container from horizontal motion;
   e) a tray mounting surface substantially perpendicular to said tray surface; and
   f) a bracket having a substantially upright dovetail-shaped surface, said surface adapted for slidable engagement with said tray mounting surface, said bracket having means for removable attachment to a vehicle dashboard so that said tray surface is cantilevered from the vehicle dashboard in a substantially horizontal plane with resistance to horizontal motion in any direction.

2. The vehicle snack tray of claim 1 wherein said means for removable attachment of said bracket comprises at least one pair of upward and downward facing hook-shaped members adapted to fit over the top and bottom lips of an ashtray of a vehicle dashboard.

3. The vehicle snack tray of claim 1 wherein said means for removable attachment of said bracket comprises at least one male member adapted to frictionally fit into an orifice of a vehicle dashboard.

4. The vehicle snack tray of claim 1 wherein said at least one opening has a keyhole-shape in order to receive a beverage mug having a handle.

5. A vehicle snack tray comprising:
   a) a snack tray having a tray mounting surface and a stop surface; and b) a bracket having a slidably engaging tray mounting surface adapted to mate with said tray mounting surface of said snack tray, said slidably engaging tray mounting surface being substantially upright when said bracket is attached to a vehicle dashboard such that said tray is slidable downward against said stop surface, said bracket also having at least one male member adapted to frictionally fit into a substantially rectangular orifice of a vehicle dashboard.

6. A vehicle snack tray comprising:
a) a snack tray having a dovetail shaped tray mounting surface; and b) a bracket having a dovetail shaped tray mounting surface adapted to slidably engage with said dovetail shaped tray mounting surface of said snack tray, said dovetail shaped tray mounting surface of said bracket being substantially upright when said bracket is attached to a vehicle dashboard, said bracket also having three male projections with ribs that are shaped to snugly fit into a substantially rectangular orifice of a vehicle dashboard, said rectangular orifice having a taper to frictionally engage said ribs of said male projections when fully inserted.

* * * * *